United States Patent Office 3,086,885
Patented Apr. 23, 1963

---

3,086,885
NON-CLUMPING FOAMABLE THERMOPLASTIC POLYMER GRANULES AND METHOD OF MAKING
Alex K. Jahn, Midland, Mich., assignor to The Dow Chemical Company, Midland, Mich., a corporation of Delaware
No Drawing. Filed Sept. 22, 1960, Ser. No. 57,616
5 Claims. (Cl. 117—100)

This invention concerns compositions consisting of granular or particulate foamable thermoplastic organic polymers having on the surfaces thereof water-repellant non-clumping agents for inhibiting the formation of aggregates of said particles upon expanding the same by heating to produce free-flowing incompletely foamed-up polymer granules, and pertains to a method of making the same.

It is known to prepare foamable polystyrene or styrene polymers by incorporating therewith a volatile organic compound such as pentane, petroleum ether, perchlorofluorocarbons, e.g. dichlorodifluoromethane, dichlorotetrafluoroethane, and the like, and to expand or foam such thermoplastic organic polymers by heating a body or mass of the polymer, preferably in particulate form, in a porous mold to produce cellular or foamed articles having a shape corresponding to that of the mold cavity. In the making of molded articles, it is common practice to fill or substantially fill a porous mold with a mass of the foamable polymer granules which have been partially or incompletely foamed-up and still contain sufficient of the volatile organic fluid, or raising agent, which upon heating of the polymer to its softening point or above and above the boiling point of the volatile organic fluid results in further expanding of the polymer granules in the mold and a pressing together and bonding of the particles, because of the expansion, into a shaped cellular article. In order to prepare, incompletely foamed-up small-particled thermoplastic organic polymers from the solid polymer particles containing a volatile organic fluid raising agent, the polymer particles are heated above the softening point of the polymer for such a length of time that only part of the foaming agent is used up or vaporized in expanding or prefoaming the polymer particles. For example, polystyrene beads containing petroleum ether, B.P. 30–46° C., can be incompletely foamed-up by immersion in water at 75° to 100° C. for about 3 to 10 minutes, or by heating with steam at atmospheric pressure for a similarly short period of time, then cooling or allowing the prefoamed granules to cool to room temperature or thereabout.

It has been observed, in preparing the incompletely foamed-up polymer granules, that many of the polymer granules are normally susceptible to clumping into aggregates of a plurality of particles adhered to one another upon expanding by heating during the prefoaming treatment, and these aggregates are disadvantageous and undesirable in subsequent use of the prefoamed granules in the making of cellular articles having a desired shape.

Accordingly, it is a primary object of the invention to provide a method and agents for inhibiting or preventing the clumping of foamable thermoplastic organic polymers upon incompletely foaming-up by heating, to produce free-flowing prefoamed polymer granules. Another object is to produce free-flowing compositions comprising discrete particles of incompletely foamed-up thermoplastic organic polymers containing a volatile organic fluid foaming agent and which polymer particles are normally susceptible to clumping into aggregates of a plurality of said particles adhered to one another upon expanding by heating. A further object is to provide a method and agents for inhibiting or preventing the clumping of foamable thermoplastic organic polymers upon being incompletely foamed-up, which agents are effective for said purpose, but do not inhibit or prevent the bonding together of said incompletely foamed-up polymer particles upon subsequent further expanding in a mold to produce a cellular molded article. Other and related objects will become apparent from the following description of the invention.

According to the invention, the foregoing and related objects are obtained by coating onto the surfaces of the granules of a foamable thermoplastic organic polymer normally susceptible to clumping into aggregates of a plurality of granules adhered to one another upon expanding by heating during an incompletely prefoaming treatment, a fluid polysiloxane of the formula $R_2SiO$ wherein R represents a radical of the group consisting of the methyl and the phenyl radical and wherein at least 75 percent of the total R radicals in the polysiloxane are methyl radicals in amount corresponding to from about 5 to about 500, preferably from 5 to 300, parts by weight of the polysiloxane per million parts by weight of the polymer.

It is important that the polysiloxane be employed in amounts within the range of from about 5 to 500 parts by weight per million parts by weight of the polymer, or stated differently, in amounts corresponding to from about 0.0005 to 0.0500 percent by weight of the polymer, in order to obtain the improved free-flowing non-clumping prefoamed polymer granules, and to avoid the formation of foamable or foamed polymer articles which have an enhanced flammability.

The polysiloxanes to be employed in the invention are the fluid, liquid to paste-like, benzene-soluble diorganopolysiloxanes in which the siloxane units consist of units of the structural formula $R_2SiO$ wherein R is a radical selected from the group consisting of the methyl radical and the phenyl radical and wherein at least 75 percent of the total number of the R radicals in the polysiloxane are methyl radicals. The polysiloxane can be one in which all of the siloxane units are $(CH_3)_2SiO$ or the siloxane may be a copolymer of dimethyl siloxane and a minor proportion of the units: $C_6H_5(CH_3)SiO$ or $$(C_6H_5)_2SiO$$

provided that the polysiloxane employed contains at least 75 percent of the total R radicals therein as methyl radicals. The polysiloxanes are preferably normally liquid silicone fluids such as are readily available on the open market in the form of liquids per se or as solutions in organic solvents which are poor solvents for the polymer or as aqueous emulsions of the same.

It is also important that the herein specified polysiloxanes be employed in amounts corresponding to not more than about 500 parts by weight per million parts by weight of the polymer in order to avoid enhancing the flammability or burning rate of the foamed cellular product.

It has now been discovered that the applying of a polysiloxane coating to the surfaces of a foamable thermoplastic organic polymer such as polystyrene or to a foamable styrene polymer containing an organic bromide as flame-proofing agent, in amounts greater than herein specified, then foaming the polymer, for example by heating in a porous mold, results in the formation of a cellular product which burns at an accelerated rate. It has further been discovered that the incorporating of the polysiloxane throughout the foamable flame-proofed polymer granules, even in amounts within the range herein specified e.g., in amounts of 0.01 percent by weight or more, then foaming of the polymer granules in a mold to produce a cellular article, results in the making of a cellular product which readily burns.

In contrast, the free-flowing compositions of the invention comprising discrete particles of a foamable thermoplastic organic polymer containing a volatile organic fluid foaming agent and normally susceptible to clumping into aggregates of a plurality of said particles adhered to one another upon expanding by heating, are readily obtained by coating onto the surfaces of said polymer particles from 0.0005 to 0.0500 percent by weight of a fluid polydiorganosiloxane of the formula $R_2SiO$ wherein R is a radical selected from the group consisting of the methyl radical and the phenyl radical and wherein at least 75 percent of the total R radicals in the polysiloxane are methyl radicals.

The thermoplastic organic polymer to be employed can be any normally solid organic polymer which is thermoplastic and contains a volatile organic fluid foaming agent which is soluble in, but does not dissolve, the polymer. The organic polymers are preferably alkenyl aromatic polymers which contain in polymerized or interpolymerized form at least 50 percent by weight of at least one monoalkenyl aromatic compound having the general formula

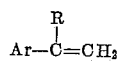

$$Ar-\overset{R}{\underset{|}{C}}=CH_2$$

wherein Ar represents an aromatic radical of the group consisting of hydrocarbon and nuclear halohydrocarbon radicals of the benzene series and R represents a member of the group consisting of hydrogen and the methyl radical. Examples of such alkenyl aromatic polymers are the solid homopolymers and copolymers of styrene, vinyltoluene, vinylxylene, isopropyl styrene, tert.-butyl styrene, ethylvinylbenzene, chlorostyrene, dichlorostyrene, bromostyrene, fluorostyrene, and the solid copolymers of one or more of such monoalkenyl aromatic compounds with minor amounts of other readily copolymerizable olefinic compounds such as divinylbenzene, methylmethacrylate or acrylonitrile.

The volatile organic fluid foaming agent can be a gas or liquid such as a saturated aliphatic hydrocarbon containing from 4 to 7 carbon atoms in the molecule, e.g. butene, pentane, hexane, heptane, or petroleum ether, having a molecular weight of at least 58 and boiling at temperatures below 95° C. at 760 millimeters absolute pressure or perchlorofluorocarbons such as dichlorodifluoromethane, trichlorofluoromethane, trifluorochloromethane, dichlorotetrafluoromethane and the like boiling at temperatures below 95° C. at 760 millimeters. Such volatile organic fluids are usually employed in amounts corresponding to from 0.05 to 0.4 gram molecular proportion of the volatile organic compound per 100 grams of the polymer. Methods of incorporating the foaming agents such as by soaking or steeping in, polymerizing the monomers in admixture with the volatile organic fluid under pressure or of blending the solid heat-plastified polymer with the volatile organic fluid under pressure are well known and need not be discussed in detail.

In practice, the foamable polymer granules in solid or dense foam, i.e. substantially non-foamed, are blended, preferably with an aqueous emulsion or a solution of the fluid polydiorganosiloxane, in the amount to uniformly distribute the siloxane over the surfaces of the granules, after which the granules are dried or allowed to dry in air at room temperature or thereabout. Blending of the polymer granules with the polysiloxane or an aqueous emulsion thereof is also carried out at room temperature or thereabout and at atmospheric or substantially atmospheric pressure.

The invention is advantageously employed for the making of free-flowing compositions comprising discrete particles of foamable thermoplastic organic polymers such as flammable alkenyl aromatic polymers, normally susceptible to clumping into aggregates of a plurality of said particles upon expanding by heating to produce prefoamed or incompletely foamed-up particles, and which polymer particles contain intimately admixed therewith an organic bromide as flame-proofing agent, which prefoamed and free-flowing particles are suitable for use by expanding in a mold to produce cellular articles of a predetermined shape and which are flame-proof or resistant to burning.

The following examples illustrate ways in which the principle of the invention has been applied, but are not to be construed as limiting its scope.

EXAMPLE 1

In each of a series of experiments, a charge of foamable polystyrene granules in the form of beads of sizes between 0.8 and 1.5 millimeters in diameter, and containing 1.5 percent by weight of 1,2-dibromotetrachloroethane as self-extinguishing agent and about 6 percent by weight of pentane as foaming agent, uniformly dispersed throughout the beads, which beads were prepared by polymerizing monomeric styrene containing the 1,2-dibromotetrachloroethane and the pentane dissolved therein while suspended as droplets in an aqueous medium, was blended with 3 percent by weight of a liquid mixture consisting of an emulsion of water and polydimethyl siloxane in amount, based on one million parts by weight of the polystyrene starting material, as stated in the following table. After thorough blending of the polystyrene granules with the poly-dimethyl siloxane emulsion to uniformly distribute the poly-dimethyl siloxane over the surfaces of the beads, the beads were dried in air at room temperature. Portions of the dried beads were pre-foamed by heating in hot water at 95–100° C. for a period of about three minutes. A portion of the pre-foamed beads was placed in the cavity of a porous mold to substantially fill the mold cavity. The mold was closed and the beads were heated therein with steam at temperatures between 100° and 110° C. to form a cellular body having the dimensions 10 x 10 x ¼ inches. Test pieces of ¼ x 1 inch cross section by 5 inches long were cut from the molded cellular body. These test pieces were used to determine the flammability or burning time for the foamed material. The procedure for determining the burning time was to hold a test piece by one end in a horizontal position with the 1-inch dimension in a vertical plane, then hold a microburner having a 1-inch flame under the free end of the foam test piece until the foam is ignited, and immediately remove the flame. The time after igniting of the foam until it is self-extinguished is recorded and is herein called the "SE-time." Table I identifies the experiments and gives the proportion of poly-dimethyl siloxane, expressed as parts by weight per million parts by weight (p.p.m.) of the foamable polystyrene starting material, that was coated onto the surfaces of the polystyrene beads.

The table also gives the self-extinguishing time in seconds determined for the foam prepared from the coated beads. The SE-time reported in the table is an average time for from 5 to 8 tests. No clumping of the surface coated beads occurred in the pre-foaming step carried out prior to the molding of the prefoamed beads into a cellular body in the porous mold.

Table I

| Run No. | Poly-di-methyl Siloxane, p.p.m. | SE-time, seconds |
| --- | --- | --- |
| 1 | 0 | 1 |
| 2 | 10 | 1 |
| 3 | 20 | 1 |
| 4 | 30 | 1 |
| 5 | 50 | 1 |
| 6 | 75 | 1.4 |
| 7 | 100 | 1.6 |
| 8 | 150 | 1.4 |
| 9 | 200 | 2.2 |
| 10 | 300 | 6.5 |
| 11 | 400 | 11.0 |
| 12 | 500 | 12.5 |
| 13 | 700 | Burns |
| 14 | 1,000 | Burns |

Similar results are obtained when an aqueous emulsion of a liquid polysiloxane consisting of: (1) a copolymer of 90 percent by weight of dimethylsiloxane and 10 percent of diphenylsiloxane; (2) a copolymer of 50 percent by weight of dimethylsiloxane and 50 percent of methylphenylsiloxane; and (3) a copolymer of 75 percent by weight of dimethylsiloxane and 25 percent of diphenylsiloxane, instead of the polydimethylsiloxane employed in the example, or when solutions of such polysiloxanes in pentane or hexane are used.

In contrast, polystyrene granules prepared by polymerizing monomeric styrene containing a similar amount of 1,2-dibromotetrachloroethane and pentane and 0.01 percent by weight of poly-dimethylsiloxane dissolved therein, in an aqueous suspension, when foamed to produce a cellular article and tested in the same manner, burned fiercely.

EXAMPLE 2

In each of a series of experiments a charge of 20 pounds of polystyrene granules in the form of beads and sizes between 0.8 and 1.5 millimeters in diameter and containing about 6.5 percent by weight of pentane as blowing agent was blended with 3 percent by weight of an aqueous emulsion containing poly-dimethyl siloxane liquid in amounts sufficient to coat onto the surfaces of the beads the siloxane in amounts as stated in the following table. After blending of the polystyrene beads with the siloxane emulsion, the beads were dried in air stream at 40° C. The coated beads were pre-foamed by feeding the same into the bottom section of a vertical open tower equipped with a centrally positioned stirrer having a plurality of round radial arms which rotated between a plurality of stationary round arms projecting inwardly from the inner wall of said tower toward the center, while at the same time feeding steam into the bottom section of the tower. The steam upon contacting the foamable beads, heats them and causes them to expand and become of lower density. Agitating of the beads by the slow rotation of the stirrer having the round radial arms causes a lifting action on the beads such that the beads of lower density tend to rise to the top of the body of the beads and are subsequently discharged from the tower at an upper section when of a desired pre-foamed density. Portions of the pre-foamed polystyrene beads were screened to determine the proportion of beads which were clumped together as hard agglomerates of a plurality of two or more individual beads. Other portions of the pre-foamed beads were tested to determine the proportion of water adhered to the surface of the beads. The procedure for determining the amount of surface water was to suspend a weighed portion of the pre-foamed beads (obtained as they emerged from the steam pre-foaming tower) in anhydrous methyl alcohol and analyzing the alcohol for water by the Karl Fischer method. Table II identifies the experiments and gives the proportion of polydimethyl siloxane, in parts by weight per million parts by weight of the beads, employed. The table also gives the proportion of beads that were clumped together as agglomerates of a plurality of beads and the percent of surface water adhered to the beads.

Table II

| Run No. | Poly-dimethyl Siloxane, p.p.m. | Clumps, percent | Surface water, percent | Remarks |
| --- | --- | --- | --- | --- |
| 1 | 0 | 65 | 30 | Poor flowing beads. |
| 2 | 5 | 5 | 16 | Pourable beads. |
| 3 | 10 | 0 | 9 | Free flowing beads. |
| 4 | 100 | 0 | 10 | Do. |

I claim:
1. A free-flowing composition comprising discrete particles of a foamable thermoplastic styrene polymer, normally susceptible to clumping into aggregates of a plurality of said particles adhered to one another upon expanding by heating, and having on the surfaces of said particles a coating consisting of from 0.0005 to 0.0500 percent by weight of a fluid polysiloxane of the formula $R_2SiO$ wherein R is a radical selected from the group consisting of the methyl and the phenyl radicals and wherein at least 75 percent of the total R radicals in said polysiloxane are methyl radicals.

2. A free-flowing composition comprising discrete particles of a foamable thermoplastic styrene polymer, normally susceptible to clumping into aggregates of a plurality of said particles adhered to one another upon expanding by heating, and consisting essentially of a thermoplastic alkenyl aromatic polymer containing in polymerized form of at least 50 percent by weight of at least one monoalkenyl aromatic compound having the general formula:

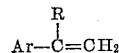

$$Ar-\underset{R}{\overset{|}{C}}=CH_2$$

wherein Ar represents an aromatic radical of the group consisting of hydrocarbon and nuclear halohydrocarbon radicals of the benzene series and R is a member of the group consisting of hydrogen and the methyl radical, said alkenyl aromatic polymer containing a volatile organic fluid selected from the group consisting of saturated aliphatic hydrocarbons containing from 4 to 7 carbon atoms in the molecule, and perchlorofluorocarbons, having a molecular weight of at least 58 and boiling at temperatures below 95° C. at 760 millimeters absolute pressure, dissolved therein in amount corresponding to from 0.05 to 0.4 gram molecular proportion of the volatile organic fluid per 100 grams of the alkenyl aromatic polymer, and said particles of said foamable alkenyl aromatic polymer having on the surfaces thereof a coating consisting of from 0.0005 to 0.0500 percent by weight of a fluid polysiloxane of the formula $R_2SiO$ wherein R is a radical selected from the group consisting of the methyl and the phenyl radicals and wherein at least 75 percent of the total R radicals in said polysiloxane are methyl radicals.

3. A free-flowing composition comprising discrete particles of a foamable thermoplastic styrene polymer consisting of polystyrene, normally susceptible to clumping into aggregates of a plurality of said particles adhered to one another upon expanding by heating, and containing a volatile organic fluid consisting of at least one saturated aliphatic hydrocarbon having from 4 to 7 carbon atoms in the molecule, a molecular weight of at least 58 and boiling at temperatures below 95° C. at 760 millimeters absolute pressure, dissolved therein in amount corresponding to from 0.05 to 0.4 gram molecular proportion of the volatile organic hydrocarbon per 100 grams of the polystyrene, and having on the surfaces of the polystyrene particles a coating of from 0.0005 to 0.0500 percent by weight of a fluid polysiloxane of the formula $R_2SiO$ wherein R is a radical selected from the group consisting of the methyl and the phenyl radicals and wherein at least 75 percent of the total R radicals in the polysiloxane are methyl radicals.

4. A composition as claimed in claim 3 wherein the foamable polystyrene particles have on the surfaces thereof a coating of from 0.0005 to 0.0500 percent by weight of a fluid poly-dimethylsiloxane.

5. A composition as claimed in claim 3 wherein the foamable polystyrene particles contain dissolved therein from 0.05 to 0.4 gram molecular proportion of a saturated aliphatic hydrocarbon boiling at temperatures between 30 and 60° C. at 760 millimeters absolute pressure per 100 grams of the polystyrene, and have on the surfaces thereof a coating of from 0.0005 to 0.0500 percent by weight of a fluid poly-dimethylsiloxane.

References Cited in the file of this patent
UNITED STATES PATENTS

| | | |
|---|---|---|
| 2,744,291 | Stastny et al. | May 8, 1956 |
| 2,806,509 | Bozzacco et al. | Sept. 17, 1957 |
| 2,861,898 | Platzer | Nov. 25, 1958 |